Nov. 19, 1940.   R. C. OLTMAN   2,222,584

BAKEPAN NESTING LUG

Original Filed April 23, 1937

INVENTOR.
Ray C. Oltman
BY Stanley Hoods
ATTORNEY.

Patented Nov. 19, 1940

2,222,584

UNITED STATES PATENT OFFICE 2,222,584

BAKEPAN NESTING LUG

Ray C. Oltman, Pasadena, Calif., assignor to The Edward Katzinger Company, Chicago, Ill., a corporation of Illinois Original application April 23, 1937, Serial No. 138,541. Divided and this application November 4, 1938, Serial No. 238,723

2 Claims. (Cl. 220—97)

This invention relates to a baking pan nesting lug operable in connection with a subjacent pan when two or more pans are nested for stacking, for holding the nested or stacked pans against relative movement, both longitudinally and transversely of the pans, thereby maintaining the walls of the pans spaced one from the other and the nested pans in a perpendicular stack.

With the above and other objects in view, as will be apparent, this invention consists in the construction, combination and arrangement of parts, all as hereinafter more fully described, claimed and illustrated in the accompanying drawing, wherein:

Figure 1:
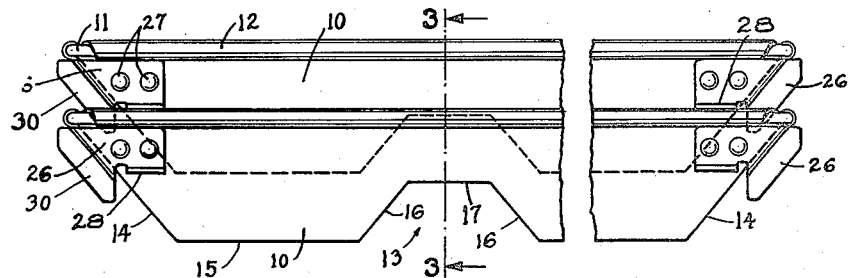
Fig. 1 is a fragmentary side elevation of two pans illustrating one nested within the other and equipped with nesting lugs constructed in accordance with the present invention.
Figure 2:
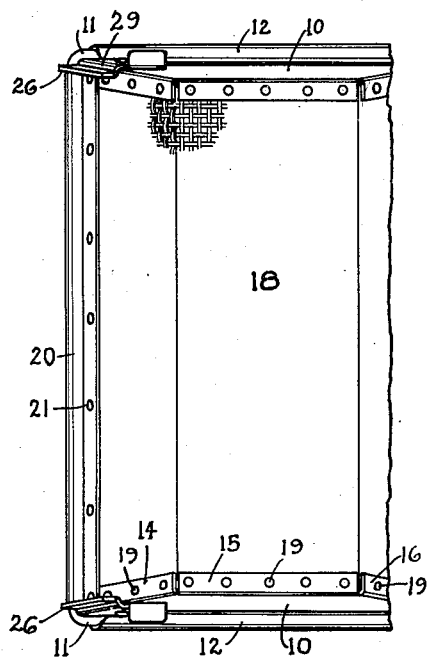
Fig. 2 is a fragmentary bottom plan view, enlarged, of a pan with the present nesting lug positioned at opposite corners thereof.
Figure 3:
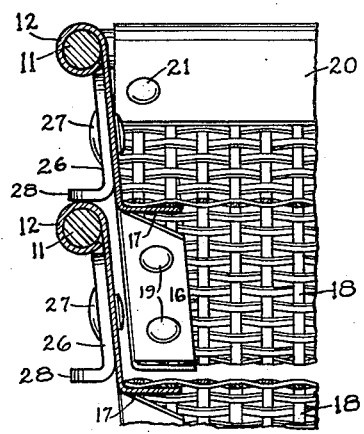
Fig. 3 is a fragmentary vertical section taken on line 3—3 of Fig. 1.

Reference being had more particularly to the drawing, 10 designates the side wall of a baking pan of any suitable construction but here shown as a hearth bread pan, having a wire frame 11 secured to the upper edges 12 of the opposed side walls 10. Each of the side walls 10 is provided with a recess 13 in the lower longitudinal edge thereof, the recesses of one of said side walls being aligned transversely of the pan with the recesses on the other side wall. Flanges 14, 15, 16 and 17 project inwardly from the end and lower longitudinal edges of said side walls 10 and the side and base edges, respectively of the recesses 13 on which a foraminated bottom 18 is supported and connected by rivets 19, to form baking compartments on either side of the recess 13. The outwardly sloping ends of the bottom 18 have their ends secured to the wire frame 11 extending between the side walls 10 by means of an overlying plate or clamp 20 secured by rivets 21.

The foregoing described construction of baking pan is disclosed in applicant's copending application Serial No. 138,541, and forms no part of the present invention but is merely illustrative of a type of pan construction to which the features of the present invention may be applied. This application is a division of application Serial No. 138,541, filed Apr. 23, 1937 and now matured into Patent No. 2,150,864.

Figure 4:
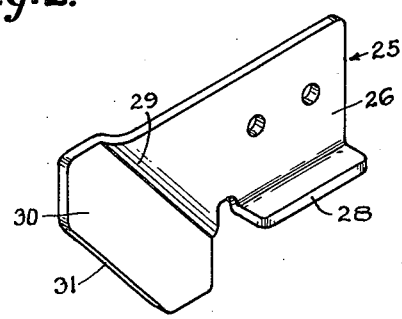
Fig. 4 is a perspective view of the nesting lug contemplated by this invention.

At each corner of the pan adjacent the upper edge of the side walls 10 is provided a nesting lug 25. This lug consists of a plate 26 attached to the side wall 10 by rivets 27. The upper longitudinal edge of this plate 26 rests directly against the adjoining edge portions of the side wall flange 12 encircling the sides of the frame 11 and this position of the upper longitudinal edge of the plate 26 is such that it will prevent the adjoining portion of the flange 12 from being disengaged from the longitudinal side of the wire frame 11. The lower longitudinal edge of the plate 26 is provided with an ear 28 projecting outwardly at right angles to the body of the plate 26. The plate 26 is bent inwardly, as at 29, to create a vertical ear 30 in a plane offset inwardly of the outer limits of the side wall 10, which ear projects outwardly beyond the end of the pan and downwardly below the horizontal ear 28. The vertical ear 30 is also provided with a downwardly and inwardly inclined outer or rear edge 31, as shown in Fig. 4, adapted to coact with the inner wall of a subjacent pan.

There is one of these nesting lugs 25 at each corner of the pan and when one pan is nested into another pan the ears 28 of the lugs of the upper pan rest upon the outstanding beads of the subjacent pan to prevent a complete nesting of the pans and the lower portions of the vertical ears 30 of the lugs 25 enter the outer corners of the subjacent pan with the edge portions 31 thereof resting against the inner surfaces of the end walls of the subjacent pan adjoining the frame 11 and the corners of the pan.

It is manifest that if there is any tendency of the pans of the stack to move relatively, longitudinally of the pans, the edge portions 31 of the ears 30 will contact against the inner surfaces of the end walls of the subjacent pan and prevent such movement, and that if there is a tendency of the pans in the stack to move relatively transversely of the pans, those portions of the vertical ears 30 of the lugs 25 projecting into the subjacent pans will contact with the inner surfaces of the side walls 10 of the subjacent pans adjoining the corners of said pans and will prevent this movement. Thus, the ears 30 of the nesting lugs 25 prevent any undue relative movement of the pans in a stack either longitudinally or transversely of the pans, while the ears 28 of the nesting lugs 25 create a nesting line by their contact with the beads of the subjacent pan.

What is claimed is:

1. A nesting lug for a baking pan, consisting of a plate secured in a vertical plane to the exterior of the pan wall adjacent an upper corner thereof, said plate having a horizontal ear projecting outwardly from its lower edge and having a vertical ear integral with the outer end portion thereof projecting outwardly beyond the end of the pan and downwardly below the horizontal ear aforesaid, said vertical ear having a downwardly and inwardly inclined outer edge for cooperation with the inner wall of a subjacent pan.

2. A nesting lug for a baking pan, consisting of a plate secured in a vertical plane to the exterior of the pan wall adjacent an upper corner thereof, said plate having a horizontal ear projecting outwardly from its lower edge and having a vertical ear integral with a portion thereof projecting outwardly beyond the end of the pan, downwardly below the horizontal ear aforesaid, and in a plane offset inwardly from said pan wall to which the plate is secured, said vertical ear having a downwardly and inwardly inclined outer edge for cooperation with the inner wall of a subjacent pan.

RAY C. OLTMAN.